United States Patent
Bode

(10) Patent No.: US 11,407,324 B2
(45) Date of Patent: Aug. 9, 2022

(54) CHARGING SYSTEMS FOR CHARGING ELECTRICAL ENERGY STORAGE DEVICES OF ELECTRIC VEHICLES AND ASSOCIATED METHODS

(71) Applicant: SIEMENS AKTIENGESELLSCHAFT, Munich (DE)

(72) Inventor: Sebastian Bode, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 19 days.

(21) Appl. No.: 16/981,803

(22) PCT Filed: Feb. 15, 2019

(86) PCT No.: PCT/EP2019/053832
§ 371 (c)(1),
(2) Date: Sep. 17, 2020

(87) PCT Pub. No.: WO2019/179703
PCT Pub. Date: Sep. 26, 2019

(65) Prior Publication Data
US 2021/0046830 A1    Feb. 18, 2021

(30) Foreign Application Priority Data
Mar. 19, 2018   (DE) .................. 102018204126.1

(51) Int. Cl.
*B60L 53/62* (2019.01)
*B60L 53/10* (2019.01)
(Continued)

(52) U.S. Cl.
CPC .............. *B60L 53/62* (2019.02); *B60L 53/11* (2019.02); *B60L 53/16* (2019.02); *B60L 53/66* (2019.02);
(Continued)

(58) Field of Classification Search
CPC ....................................... B60L 53/62
(Continued)

(56) References Cited

U.S. PATENT DOCUMENTS

| 11,267,356 B2 | 3/2022 | Bode et al. |
| 2013/0049677 A1 | 2/2013 | Bouman |

(Continued)

FOREIGN PATENT DOCUMENTS

| CN | 107169603 A | 9/2017 |
| DE | 102011007839 A1 | 10/2012 |

(Continued)

OTHER PUBLICATIONS

German Office Action for German Application No. 10 2018 204.126.1 dated Dec. 3, 2018.
(Continued)

*Primary Examiner* — Jerry D Robbins
(74) *Attorney, Agent, or Firm* — Lempia Summerfield Katz LLC

(57) ABSTRACT

The disclosure relates to a charging system for charging an electrical energy storage device in an electric vehicle. The charging system includes: an input for an alternating current, which is provided with a source of electrical energy, at least one transformer element for transforming the alternating current into a direct current, and a charge output for connecting the charging system to the electric vehicle. The charging system is configured to connect the at least one transformer element to the charge output for charging the electrical energy storage device with direct current. The
(Continued)

charging system is further configured to connect the input to the charge output for charging the electrical energy storage device with alternating current.

14 Claims, 4 Drawing Sheets

(51) Int. Cl.
  *B60L 53/66* (2019.01)
  *B60L 53/16* (2019.01)
  *H02J 7/00* (2006.01)
  *H02J 7/04* (2006.01)
  *B60K 6/28* (2007.10)

(52) U.S. Cl.
  CPC ........ *H02J 7/00045* (2020.01); *H02J 7/0047* (2013.01); *H02J 7/04* (2013.01); *B60K 6/28* (2013.01); *B60L 2210/30* (2013.01); *B60Y 2200/91* (2013.01); *B60Y 2200/92* (2013.01); *B60Y 2300/91* (2013.01); *H02J 2207/20* (2020.01)

(58) Field of Classification Search
  USPC ........................................................ 320/109
  See application file for complete search history.

(56) References Cited

U.S. PATENT DOCUMENTS

| | | |
|---|---|---|
| 2014/0042967 A1 | 2/2014 | Herzog |
| 2014/0091764 A1 | 4/2014 | Kinomura |
| 2014/0159670 A1* | 6/2014 | Lee ............................ B60L 3/04 320/134 |
| 2016/0193933 A1* | 7/2016 | Jiang ...................... B60L 53/665 320/109 |
| 2017/0253134 A1* | 9/2017 | Berger .................. B60L 3/0092 |
| 2018/0201142 A1* | 7/2018 | Galin ...................... B60L 53/14 |
| 2018/0281613 A1 | 10/2018 | Yu |
| 2021/0046830 A1* | 2/2021 | Bode ...................... B60L 53/11 |

FOREIGN PATENT DOCUMENTS

| | | |
|---|---|---|
| DE | 102013211944 A1 | 6/2014 |
| DE | 102014109939 A1 | 1/2016 |
| DE | 102014223585 A1 | 5/2016 |
| DE | 102018202259 A1 | 8/2019 |
| JP | 2011223796 A | 11/2011 |
| WO | 2017096651 A1 | 6/2017 |

OTHER PUBLICATIONS

Notice of Submission the International Provisional Patentability Report for International Patent Application PCT/EP2019/053832 dated Jun. 18, 2020.

Written Notice of the International Preliminary Audit Authority for International Patent Application PCT/EP2019/053832 dated Mar. 2, 2020.

* cited by examiner

CHARGING SYSTEMS FOR CHARGING ELECTRICAL ENERGY STORAGE DEVICES OF ELECTRIC VEHICLES AND ASSOCIATED METHODS

The present patent document is a § 371 nationalization of PCT Application Serial No. PCT/EP2019/053832, filed Feb. 15, 2019, designating the United States, which is hereby incorporated by reference, and this patent document also claims the benefit of German Patent Application No. 10 2018 204 126.1, filed Mar. 19, 2018, which is also hereby incorporated by reference.

TECHNICAL FIELD

The present disclosure relates to charging systems for charging electrical energy storage devices of electric vehicles. Furthermore, the present disclosure relates to methods for charging electrical energy storage devices of electric vehicles.

BACKGROUND

At the present time, interest is being directed at charging systems for charging electrical energy storage devices of electric vehicles. Such an electric vehicle may be a purely electrically driven vehicle or a hybrid vehicle. Various charging systems and charging methods are known from the prior art. By way of example, so-called direct current charging may be carried out, which is also referred to as DC fast charging. In this case, an alternating current provided by a power supply system is converted or rectified with the aid of at least one converter element. Furthermore, so-called alternating current charging or AC charging is known.

For the billing of electrical energy supplied during direct current charging, a measurement of the direct current supplied according to kilowatt-hours is necessary according to the legal requirements. The measuring devices or electricity meters used for this purpose have to cover a high dynamic range both with regard to the electrical voltage and with regard to the electrical current. While with regard to the electrical voltage there are ranges in which charging actually does not take place, the charging current may become very small precisely in the case of trickle charging. Presently available measuring devices for high direct currents achieve a dynamic range of the current between 20 Amps (A) and 550 A. With such measuring devices, it is therefore not possible to measure the electrical energy or power in a manner that conforms to calibration laws and standards in the case of trickle charging on account of the required accuracy and the limited achievable dynamic range of the measuring converters and measuring meters.

Regulations are known which allow the detection of the required AC energy, which is then converted and charged. Furthermore, business models are being realized which dispense with detecting the energy in a manner that conforms to calibration laws and standards. By way of example, time tariffs, flat rate tariffs and/or free distributions are known. Furthermore, the DC fast charging systems for currents up to 500 A are only just being built, and so the problem does not arise in this way. By reducing the largest measurable current, it is possible for the smallest measurable current to be reduced as well.

DE 10 2014 223585 A1 discloses a system for charging an electrical energy storage device of a vehicle. The system includes a vehicle-side plug having first contacts and second contacts, wherein, in order to form a first current path, the first contacts are coupled to the electrical energy storage device of the vehicle via a first controllable voltage converter, and wherein, in order to form a second current path, the second contacts are able to be coupled to the electrical energy storage device of the vehicle.

JP 2011 223796 A discloses a vehicle charging apparatus including a first charging circuit by a vehicle-internal charger and a second charging circuit by a fast charger.

DE 10 2011 007839 A1 discloses a vehicle charging apparatus including a charging station outside a vehicle, a charging cable, and a charging electrical system of the vehicle, for charging an electrical energy storage device of the vehicle with electrical energy from an external AC power supply system.

DE 10 2014 109939 A1 discloses a local charging network having at least one charging system for charging electric vehicles. The charging system includes at least one charging station, at least one power supply, at least one control and/or regulating device, wherein the at least one charging station has at least one charging apparatus for an electric vehicle, wherein the at least one charging station is configured for outputting alternating current and direct current.

WO 2017/096651A1, or its English-language equivalent US 2018/0281613A1, discloses a mobile charging system and method. The system includes a rescue vehicle application, a charging rescue vehicle, and a rescue platform. The mobile charging system and method make it possible for the charging rescue vehicle to approach a drained electric vehicle and charge it. The charging rescue vehicle includes a generator with a charging apparatus configured for outputting alternating current and direct current. A direct current charging process or else an alternating current charging process is instigated depending on the user's choice.

SUMMARY AND DESCRIPTION

It is an object of the present disclosure to demonstrate a solution as to how a charging system for charging an electrical energy storage device of an electric vehicle, (e.g., a charging system which enables direct current charging), may be operated more flexibly.

This object is achieved by charging systems and by associated methods disclosed herein. The scope of the present disclosure is defined solely by the appended claims and is not affected to any degree by the statements within this summary. The present embodiments may obviate one or more of the drawbacks or limitations in the related art.

A charging system serves for charging an electrical energy storage device of an electric vehicle. The charging system includes an input for an alternating current provided by an electrical energy source. Furthermore, the charging system includes at least one converter element for converting the alternating current into a direct current. Furthermore, the charging system includes a charging output for connecting the charging system to the electric vehicle. In this case, the charging system is configured to connect the at least one converter element to the charging output in order to carry out direct current charging of the electrical energy storage device. Furthermore, the charging system is configured to connect the input to the charging output in order to carry out alternating current charging of the electrical energy storage device. The charging system is characterized in that it has a direct current charging measuring device for determining the electrical power required during the direct current charging and an alternating current charging measuring device for determining the electrical power required during the alternating current charging, and in that the charging system is configured firstly to carry out the direct current charging and then to switch over to the alternating current charging if a current intensity of the direct current falls below a predetermined threshold value.

The charging system may be used to charge the electrical energy storage device of the electric vehicle. The electrical energy storage device may be a battery, which may have a plurality of battery cells. The battery may also be referred to as a traction battery. The electric vehicle may be a purely electrically driven vehicle. The electric vehicle may also be a hybrid vehicle, the electrical energy storage device of which or the battery of which may be charged via a charging connection. The charging system includes the input, at which the charging system is connected to an electrical energy source or a power supply system. An alternating current and/or an AC voltage may be fed to the charging system via the input. The alternating current may then be converted into the direct current and/or a DC voltage by the at least one converter element. The at least one converter element may have a rectifier. Provision may also be made for the charging system to have a plurality of converter elements, which may be electrically connected in parallel, for example. Furthermore, the charging system includes a charging output, at which the charging system may be electrically connected to the electric vehicle or to a charging connection of the electric vehicle. A corresponding plug, a socket, and/or a cable may be provided at the charging output. If the electrical energy storage device of the electric vehicle is supplied with the direct current, direct current charging or so-called DC fast charging may be carried out.

In certain examples, the charging system is configured to connect the input to the charging output in order to carry out alternating current charging of the electrical energy storage device. Thus, direct current charging or DC fast charging may be carried out with the aid of the charging system. Furthermore, alternating current charging or AC charging becomes possible. Consequently, two different charging methods may be realized with the aid of the charging system. The charging system may therefore be operated more flexibly overall.

The charging system may be configured to carry out the direct current charging and then to switch over to the alternating current charging if a current intensity of the direct current falls below a predetermined threshold value. The predetermined threshold value may be 20 A, for example. After the charging system has been connected to the electric vehicle or after the charging cable has been plugged in, a charging process in accordance with IEC 61851 may start. The latter may be changed over to ISO 15118 by so-called 5% signaling. After the charging process has started, the electric vehicle is charged by the DC fast charging technique. As the state of charge (SoC) rises, the electric vehicle will reduce the required charging current or direct current. Based on the required charging current, the charging system decides whether the charging process is to be continued as direct current charging. For this purpose, it is possible in particular to take account of whether the current intensity of the direct current falls below the threshold value. A change from direct current charging to alternating current charging may be configured to take place if the state of charge of the battery has reached a predetermined value.

In this case, the switchover or the change from direct current charging to alternating current charging may be carried out depending on at least one further criterion. By way of example, a customer's desire may be taken into account as a criterion. In this case, the customer's desire may originate from a profile or an input. The profile or the customer's desire may also be transmitted from the electric vehicle to the charging system. Furthermore, the present grid situation or a state of an electrical energy source or of the power supply system which provides the alternating current may be taken into account. Moreover, a present capacity utilization, that is to say whether the components are required for fast charging at another charging output, may be taken into account. Overall this enables efficient and user-friendly operation of the charging system.

In one embodiment, the charging system has a direct current charging measuring device for determining the electrical power or electrical energy required during the direct current charging. In addition, the charging system has in particular an alternating current charging measuring device for determining the electrical power or electrical energy required during the alternating current charging. By switching over, e.g., from the direct current charging to the alternating current charging if the current intensity of the direct current falls below the threshold value, the dynamic range of the direct current charging measuring device may be sufficient. As already explained in the introduction, the dynamic range of the direct current charging measuring device or of the energy meter for the direct current may be between 20 A and 550 A. In this range, the electrical power required during the direct current charging may be determined with the required accuracy. This enables the DC measurement actually to be carried out in the first place using a presently available direct current charging measuring device or a DC meter. In the future, too, the requirements made of the components of the DC meter in respect of accuracy will be reduced by the introduction of the minimum measurable current, which will be manifested in lower costs for the DC meter. If this range is left, it is possible to change to alternating current charging. Here, the required electrical power or energy may then be determined with the aid of the alternating current charging measuring device or a corresponding energy meter for the alternating current and/or the AC voltage. Corresponding alternating current charging measuring devices or AC meters that are approved for all combinations of currents and voltages possible during alternating current charging are commercially available. Billing may then be effected based on the electrical power respectively required during the direct current charging and the alternating current charging. The above-described switchover between the direct current charging and the alternating current charging enables the electrical power respectively required to be determined accurately and the billing thus to be carried out precisely.

The charging system may include a first switching device between the at least one converter element and the charging output, a second switching device between the input and the charging output, and a control device for controlling the first switching device and the second switching device. The electrical connection between the at least one converter element and the charging output may be switched with the aid of the first switching device. The electrical connection between the input of the charging system and the charging output may be switched by the second switching device. The first switching device and the second switching device may be driven with the aid of the control device. It is thus possible to switch over from the direct current charging to the alternating current charging in a simple manner.

In a further embodiment, the charging system is configured to output a predetermined signal upon switching over from the direct current charging to the alternating current charging. If the charging system decides to change to the AC charging, the charging system may signal this to the electric vehicle by way of the protocol in accordance with ISO 15118 and may start a new charging process based on IEC 61851 alone. For this purpose, by way of example, the state "State E" may be signaled for a short time. In order to avoid manipulations, the State E signaling may be performed in such a way that instead of the normatively required voltage of 0 V, a higher voltage is applied across a resistor having a high resistance. Actual unplugging of a charging cable may be identified in this way. In parallel with this, the entire fast charging section will be released and may optionally be used in a different way.

In accordance with a further embodiment, the charging system is configured to receive authentication data from the electric vehicle and to store the authentication data. The authentication is effected by a method known from the prior art. The authentication data are stored, however, such that they may be used again for a subsequent charging process. By way of example, the authentication data may be transmitted and stored during the direct current charging and thus be used during the subsequent alternating current charging. In particular, the authentication data may be stored on a corresponding memory of the charging system. Billing may thus be guaranteed even after the change from the direct current charging to the alternating current charging.

The charging output may be compatible with a combo 2 vehicle coupling. In particular, the charging output is configured as a so-called combined charging system (CCS). This vehicle coupling may correspond to the type 2 vehicle coupling with two additional direct current poles. The charging output may have an AC part having, for example, three connections for the phases, a connection for the neutral conductor, and a connection for the protective conductor. In addition, the AC part may have a connection for the dialog between the charging system and the electric vehicle and a connection for limiting the charging current. In addition, the charging output may have a DC part having a positive and a negative connection. Firstly, single- and three-phase alternating current charging may thus be made possible. In addition, direct current charging may be made possible.

In accordance with a further configuration, the charging system has at least two charging outputs. In this case, each of the charging outputs may be connected to an electric vehicle. This makes it possible, in particular, that at least two electric vehicles or the electrical energy storage devices thereof may be charged simultaneously or in parallel. As explained above, the charging system may have a corresponding control device and switching devices. Furthermore, this makes it possible that in particular the high-priced components required for the direct current charging are already dynamically assigned to the other charging output of the charging system upon the switchover to the alternating current charging. Moreover, better capacity utilization of the high-priced components may be achieved.

A further charging system serves for charging an electrical energy storage device of an electric vehicle. The charging system includes an input for an alternating current provided by an electrical energy source. In addition, the charging system includes at least one converter element for converting the alternating current into a direct current. Furthermore, the charging system includes a charging output for connecting the charging system to the electric vehicle. In this case, the charging system is configured to connect the at least one converter element to the charging output in order to carry out first direct current charging of the electrical energy storage device. Moreover, the charging system includes a first direct current charging measuring device for determining the electrical power required during the first direct current charging. In this case, the charging system is configured to carry out second direct current charging after the first direct current charging, wherein the charging system has a second direct current charging measuring device for determining the electrical power required during the second direct current charging. In the case of this charging system, after a DC fast charging process a further DC charging process may be carried out, a different measuring device being used here. During the first direct current charging, the current intensity may be higher than during the second direct current charging. In this case, provision is made, in particular, for the first direct current charging measuring device and the second direct current charging measuring device to differ from one another with regard to their dynamic range. During the first direct current charging, an electric current intensity is higher than during the second direct current charging, wherein the second direct current measuring device has a dynamic range which is below a dynamic range of the first direct current measuring device.

One method serves for charging an electrical energy storage device of an electric vehicle. The method includes converting an alternating current provided at an input of a charging system into a direct current by at least one converter element. In addition, the method includes carrying out direct current charging of the electrical energy storage device by connecting the at least one converter element to a charging output of the charging system, wherein the electric vehicle is connected to the charging output. Finally, the method includes carrying out alternating current charging of the electrical energy storage device after the direct current charging by connecting the input to the charging output. Firstly, the direct current charging is carried out, then a switchover to the alternating current charging is effected if a current intensity of the direct current falls below a predetermined threshold value. In addition, the electrical power required during the direct current charging is determined by a direct current charging measuring device and the electrical power required during the alternating current charging is determined by an alternating current charging measuring device.

A further method for charging an electrical energy storage device of an electric vehicle includes converting an alternating current provided at an input of a charging system into a direct current by at least one converter element. In addition, the method includes carrying out first direct current charging of the electrical energy storage device by connecting the at least one converter element to a charging output of the charging system, wherein the electric vehicle is connected to the charging output. Furthermore, the method includes determining an electrical power required during the first direct current charging by a first direct current charging measuring device. Furthermore, the method includes carrying out second direct current charging of the electrical energy storage device after the first direct current charging, and determining an electrical power required during the second direct current charging by a second direct current charging measuring device. In the case where an electric current intensity falls below a predetermined threshold value during the first direct current charging, the first direct current charging is ended, and the second direct current charging is carried out with a lower electric current intensity. A dynamic range of the second direct current charging measuring device is below the dynamic range of the first direct current charging measuring device.

The embodiments presented with regard to the charging system and the advantages of the embodiments are applicable, mutatis mutandis, to the further charging system and to the methods disclosed herein.

Further features of the disclosure are evident from the claims, the figures, and the description of the figures. The features and feature combinations mentioned above in the description and also the features and feature combinations mentioned below in the description of the figures and/or shown solely in the figures may be used not only in the combination respectively indicated, but also in other combinations, without departing from the scope of the disclosure.

BRIEF DESCRIPTION OF THE DRAWINGS

The disclosure will now be explained in greater detail on the basis of exemplary embodiments and with reference to the accompanying drawings, in which.

In the figures, identical or functionally identical elements are provided with the same reference signs.

DETAILED DESCRIPTION

Figure 1:
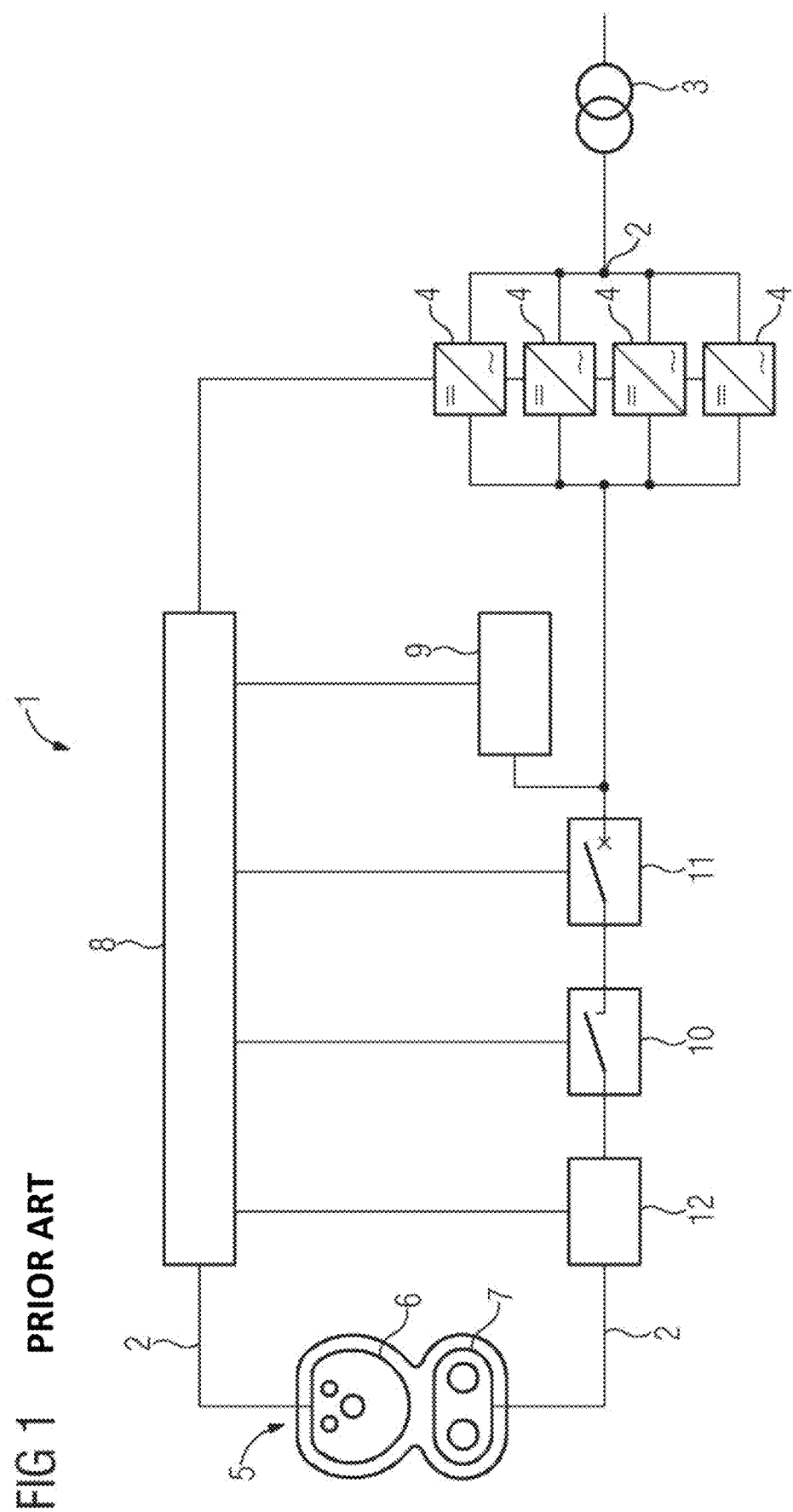
FIG. 1 depicts a charging system for carrying out direct current charging of the electrical energy storage device of an electric vehicle in accordance with prior art.

FIG. 1 depicts a charging system 1 in accordance with the prior art in a schematic illustration. The charging system 1 includes an input 2, which is connected to an electrical energy source 3. The electrical energy source 3, which may be provided by a power supply system, for example, serves to provide an alternating current and/or an AC voltage. Furthermore, the charging system 1 includes at least one converter element 4. In the present exemplary embodiment, the charging system 1 includes four converter elements 4, which are electrically connected in parallel. The converter elements 4 are rectifiers. The alternating current present at the input 2 may be converted into a direct current by the rectifiers or the converter elements 4.

Furthermore, the charging system 1 includes a charging output 5, to which an electric vehicle may be connected in order to charge the electrical energy storage device of the electric vehicle. The charging output 5 includes an AC part 6, which may be used for alternating current charging, and also a DC part 7, which may be used for direct current charging of the electrical energy storage device. The charging output 5 is configured as a combined charging system. The DC part 7 has a positive and a negative connection. In the present case, the AC part 6 has a protective conductor. In addition, the AC part 6 has a connection for the dialog between the charging system 1 and the vehicle by an analog signal (CP, control pin) and also a connection for limiting the charging current by resistance coding (PP, proximity pilot). These two connections are connected to a control device 8 of the charging system 1. In addition, the control device 8 may receive data from an isolation monitor 9. Furthermore, the charging system 1 includes a first switching device 10, which may be driven by the control device 8. In this way, the converter elements 4 may be connected to the charging output 5. Furthermore, a contactor 11 is provided.

Furthermore, the charging system 1 includes a direct current charging measuring device 12, which may be used to determine the electrical power during the direct current charging of the electrical energy storage device. The direct current charging measuring device 12 has a dynamic range with regard to the current of approximately 20 A to 550 A. Consequently, it is not possible that, for example, very low charging currents during trickle charging may be detected in the manner that conforms to calibration laws and standards.

Figure 2:
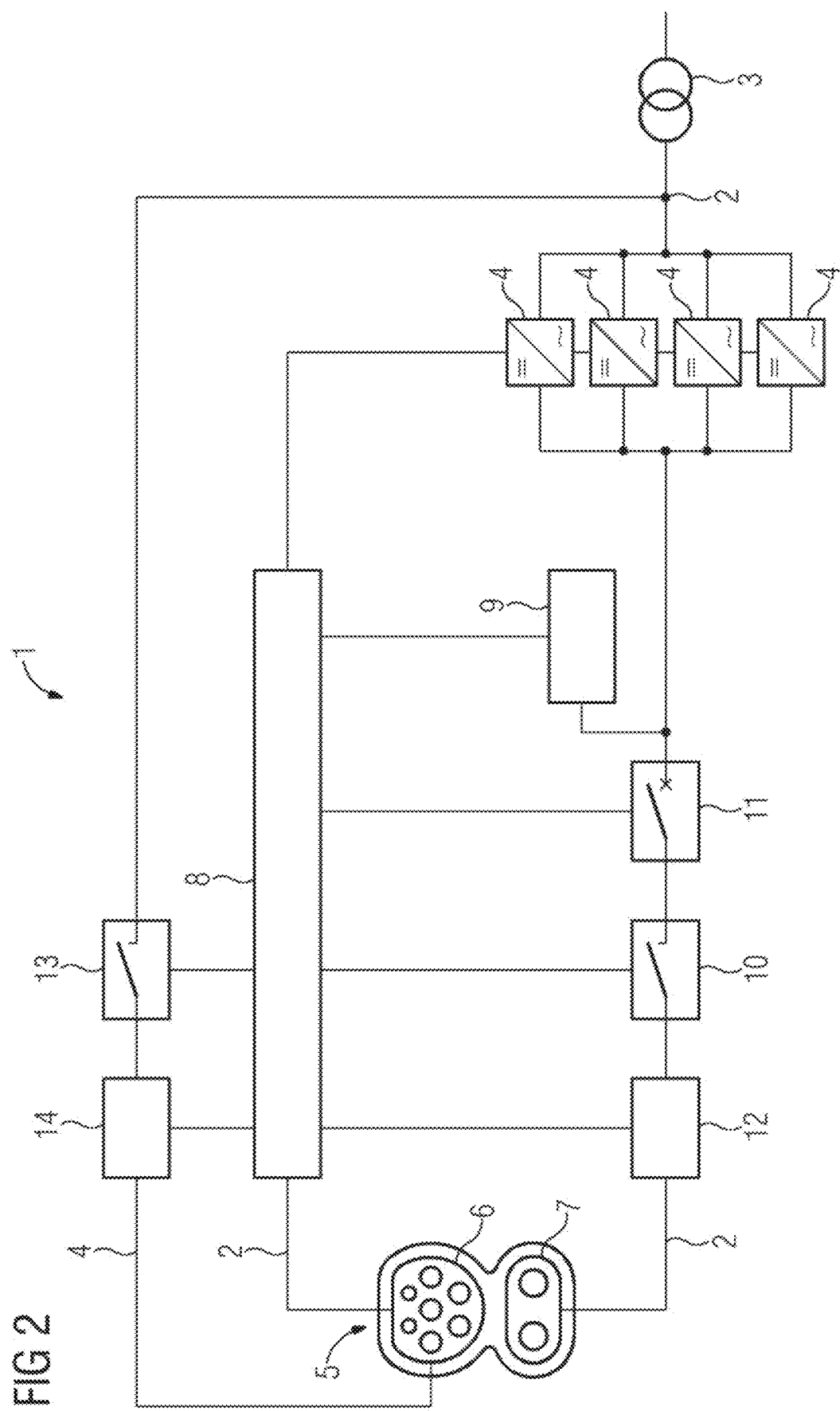
FIG. 2 depicts a charging system in accordance with one embodiment for carrying out direct current charging and also alternating current charging of the electrical energy storage device.

FIG. 2 depicts a charging system 1 in accordance with an embodiment. In comparison with the charging system 1 in accordance with FIG. 1, in this example, the charging output 5 or the AC part 6 thereof is fully equipped. The AC part 6 additionally has connections for three phases and also a neutral conductor. Furthermore, the charging system is provided with a second path, via which the input 2 may be directly connected to the charging output 5 or the AC part 6 of the charging output 5. For this purpose, a second switching device 13 is provided, which may likewise be driven by the control device 8. Consequently, alternating current charging of the electrical energy storage device of the electric vehicle may also be made possible. Furthermore, an alternating current charging measuring device 14 is situated in the path. The electrical power required during alternating current charging may be determined by the alternating current charging measuring device 14.

When the electrical vehicle is connected to the charging output 5, firstly direct current charging or so-called DC fast charging may be carried out. For this purpose, the first switching device 10 may be closed and the second switching device 13 may be opened. With the connection of the electric vehicle and the charging output 5, information may additionally be transmitted from the electric vehicle to the charging output 5 and thus to the control device 8. The information may contain authentication data. The authentication data may then accordingly be stored. During the direct current charging, the required electrical power may be detected by the direct current charging measuring device 12. If the current intensity of the direct current falls below a predetermined threshold value and/or the state of charge of the energy storage device has reached a predetermined value, the control device 8 may drive the switching devices 10, 13 such that the first switching device 10 is opened and the second switching device 13 is closed. In particular, the threshold value is chosen such that it lies within a dynamic range of the direct current charging measuring device. Below the threshold value for the direct current, a switchover to the alternating current charging is then effected. During the alternating current charging, the required electrical power may be detected precisely with the aid of the alternating current charging measuring device 14. Prior to the change between direct current charging and alternating current charging, a signal may be transmitted from the control device 8 to the vehicle. For this purpose, a predetermined voltage may be applied to a resistor or a voltage of 0 V may be output. The direct current charging may thus be ended. The stored authentication data may be used during the subsequent alternating current charging.

Figure 3:
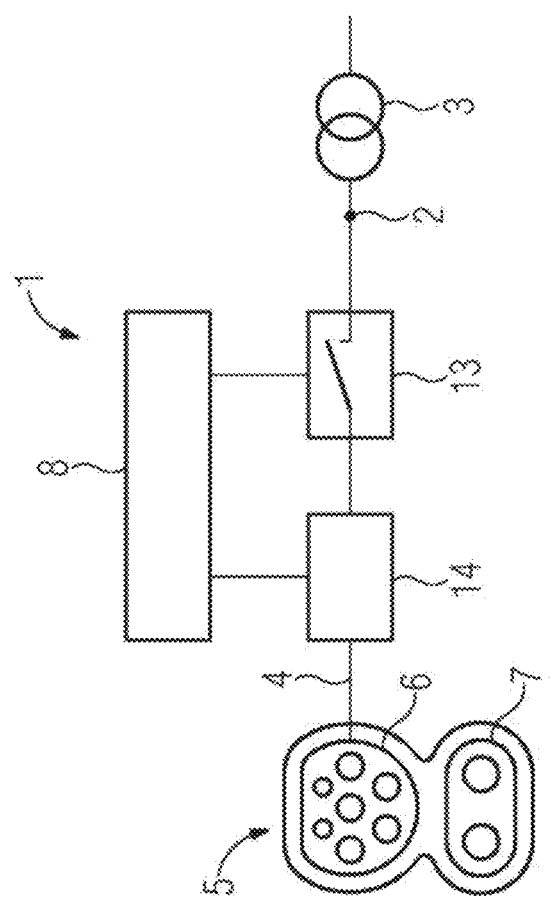
FIG. 3 depicts a schematic illustration of an example of the charging system during the alternating current charging.

FIG. 3 depicts by way of example the charging system 1 during the alternating current charging. In this example, the input 2 is connected to the charging output 5 or the AC part 6 via the second switching element 13. During the alternating current charging, the electrical power required is detected with the aid of the alternating current charging measuring device 14. The information regarding the required electrical power may then be transmitted to the control device 8.

Figure 4:
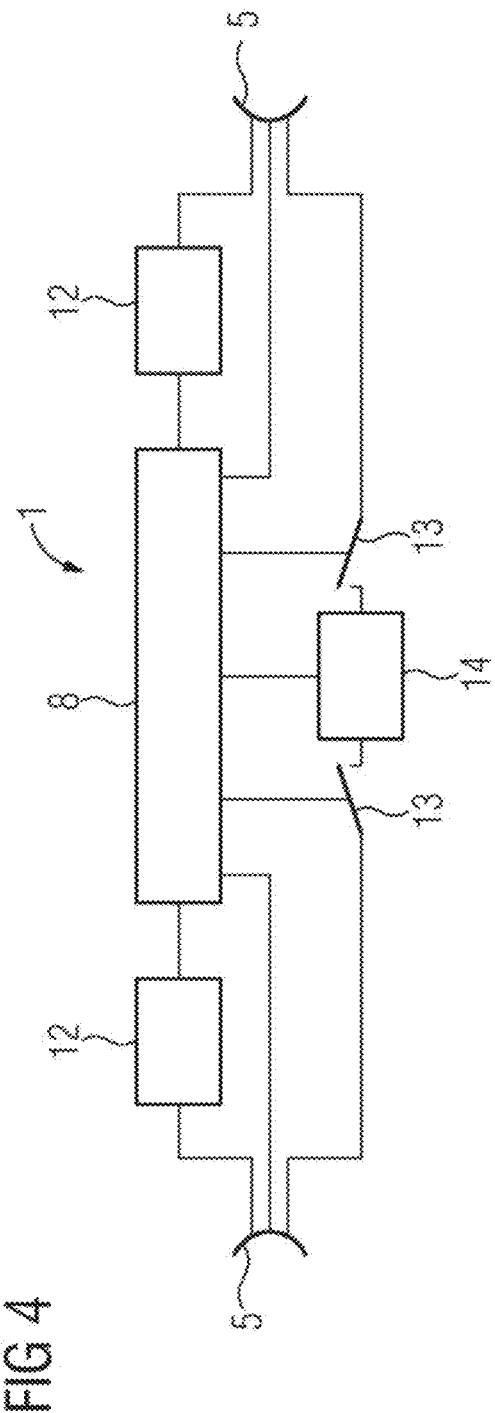
FIG. 4 depicts an example of a charging system having two charging outputs.

FIG. 4 depicts a schematic illustration of a charging system 1 in accordance with a further embodiment. This charging system 1 includes two charging outputs 5. The respective switching devices 13 may be driven with the aid of the control device 8. In the present example, a direct current charging measuring device 12 is assigned to each charging output 5. Furthermore, an alternating current charging measuring device 14 is provided for both the charging outputs 5.

Figure 5:
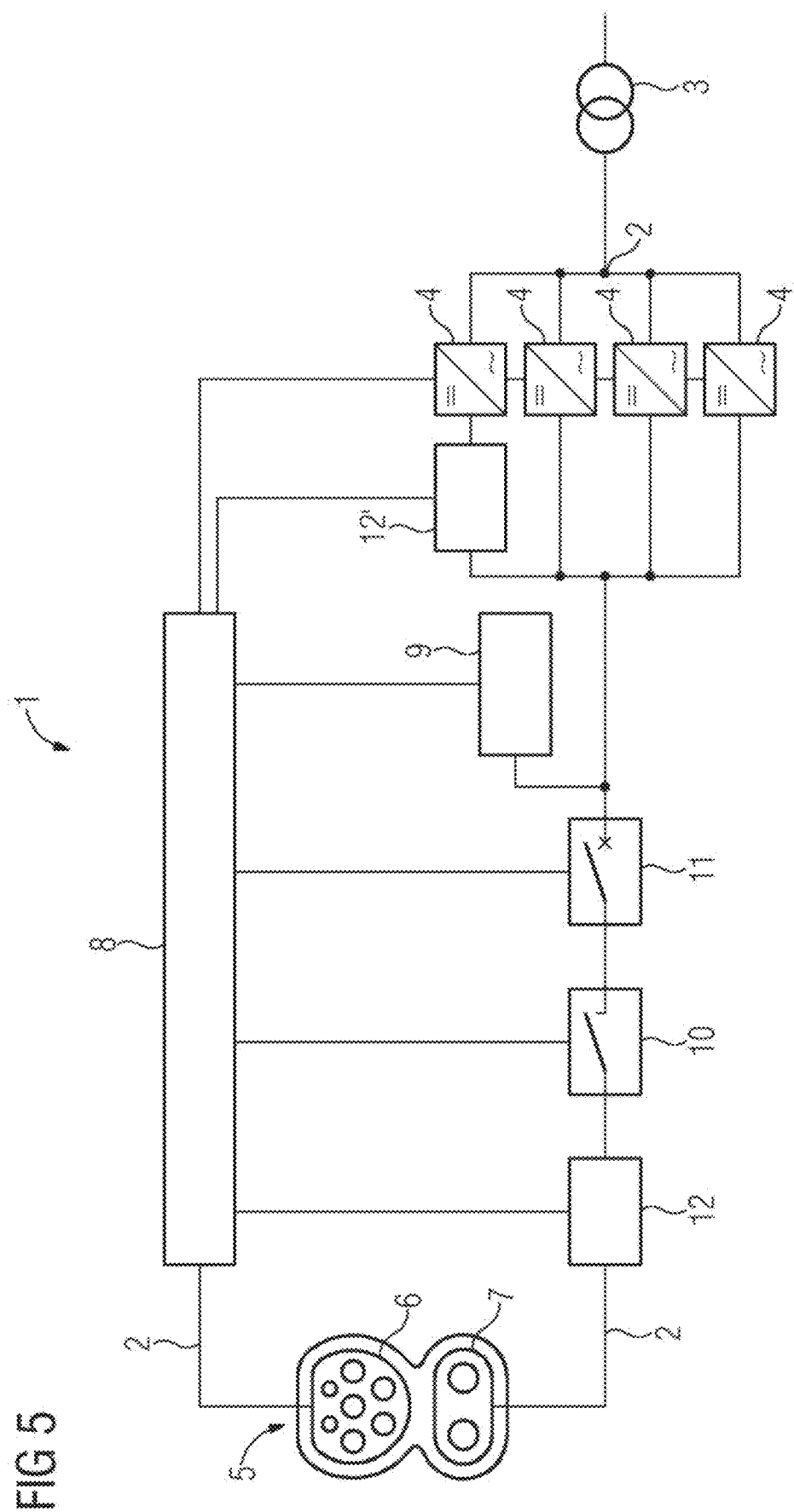
FIG. 5 depicts an example of a further charging system for carrying out successive direct current charging processes.

FIG. 5 depicts a charging system 1 in accordance with an alternative embodiment. This charging system 1 differs from the charging system 1 in accordance with FIG. 1 by virtue of a further direct current charging measuring device 12'. In the present example, the direct current charging measuring device 12' is assigned to one of the converter elements 4. During the charging of the electrical energy storage device of the electric vehicle, firstly a first direct current charging process may be carried out. In this example, the required electrical power may be determined with the aid of the direct current charging measuring device 12. If the current intensity of the direct current falls below the predetermined threshold value, the first direct current charging process may be ended and a second direct current charging process with a lower current intensity may be started. In this example, the required electrical power is determined with the aid of the second direct current charging measuring device 12'. The second direct current charging measuring device 12' may have a dynamic range that is below the dynamic range of the first direct current charging measuring device 12. Consequently, during the respective direct current charging processes, the electrical power may be determined precisely and accurate billing may thus be made possible.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A charging system for charging an electrical energy storage device of an electric vehicle, the charging system comprising:
an input for an alternating current provided by an electrical energy source;
at least one converter element for converting the alternating current into a direct current;
a charging output for connecting the charging system to the electric vehicle;
a direct current charging measuring device configured to determine an electrical power required during a direct current charging of the electrical energy storage device; and
an alternating current charging measuring device configured to determine an electrical power required during an alternating current charging,
wherein the charging system is configured to connect the at least one converter element to the charging output to carry out the direct current charging of the electrical energy storage device,
wherein the charging system is configured to connect the input to the charging output to carry out the alternating current charging of the electrical energy storage device, and
wherein the charging system is configured to carry out the direct current charging and switch over to the alternating current charging when a current intensity of the direct current falls below a predetermined threshold value and a state of charge of the electrical energy storage device has reached a predetermined value.

2. The charging system of claim 1, further comprising:
a first switching device between the at least one converter element and the charging output;
a second switching device between the input and the charging output; and
a control device for controlling the first switching device and the second switching device.

3. The charging system of claim 2, wherein the charging system is configured to output a predetermined signal upon switching over from the direct current charging to the alternating current charging.

4. The charging system of claim 3, wherein the charging system is configured to receive authentication data from the electric vehicle and to store the authentication data.

5. The charging system of claim 4, wherein the charging output is compatible with a combo 2 vehicle coupling.

6. The charging system of claim 5, wherein the charging system has at least two charging outputs.

7. The charging system of claim 1, wherein a dynamic range of the direct current charging measuring device is between 20 Amps and 550 Amps.

8. The charging system of claim 1, wherein the charging system is configured to output a predetermined signal upon switching over from the direct current charging to the alternating current charging.

9. The charging system of claim 1, wherein the charging system is configured to receive authentication data from the electric vehicle and to store the authentication data.

10. The charging system of claim 1, wherein the charging output is compatible with a combo 2 vehicle coupling.

11. The charging system of claim 1, wherein the charging system has at least two charging outputs.

12. A charging system for charging an electrical energy storage device of an electric vehicle, the charging system comprising:
an input for an alternating current provided by an electrical energy source;
at least one converter element for converting the alternating current into a direct current;
a first direct current measuring device configured to determine an electrical power required during a first direct current charging; and
a second direct current measuring device configured to determine an electrical power required during a second direct current charging, wherein the charging system is configured to connect the at least one converter element to a charging output to carry out the first direct current charging of the electrical energy storage device, wherein the charging system is configured to carry out the second direct current charging after the first direct current charging when an electric current intensity falls below a predetermined threshold value during the first direct current charging, wherein an electric current intensity is higher during the first direct current charging than during the second direct current charging, and wherein the second direct current measuring device has a dynamic range which is below a dynamic range of the first direct current measuring device.

13. A method for charging an electrical energy storage device of an electric vehicle, the method comprising:

converting an alternating current provided at an input of a charging system into a direct current by at least one converter element;

carrying out a direct current charging of the electrical energy storage device by connecting the at least one converter element to a charging output of the charging system, wherein the electric vehicle is connected to the charging output; and carrying out alternating current charging of the electrical energy storage device after the direct current charging by connecting the input to the charging output, wherein a switchover from the direct current charging to the alternating current charging is effected when a current intensity of the direct current falls below a predetermined threshold value and a state of charge of the electrical energy storage device has reached a predetermined value, and wherein an electrical power required during the direct current charging is determined by a direct current charging measuring device, and wherein an electrical power required during the alternating current charging is determined by an alternating current charging measuring device.

14. A method for charging an electrical energy storage device of an electric vehicle, the method comprising:

converting an alternating current provided at an input of a charging system into a direct current by at least one converter element;

carrying out a first direct current charging of the electrical energy storage device by connecting the at least one converter element to a charging output of the charging system, wherein the electric vehicle is connected to the charging output;

determining an electrical power required during the first direct current charging by a first direct current charging measuring device;

carrying out a second direct current charging of the electrical energy storage device after the first direct current charging when an electric current intensity falls below a predetermined threshold value during the first direct current charging; and determining an electrical power required during the second direct current charging by a second direct current charging measuring device, wherein the second direct current charging is carried out with a lower electric current intensity than the electric current intensity of the first direct current charging, and wherein a dynamic range of the second direct current charging measuring device is below a dynamic range of the first direct current charging measuring device.

* * * * *